UNITED STATES PATENT OFFICE.

JAKOB SCHMID, OF BASLE, SWITZERLAND, ASSIGNOR TO THE SOCIETY OF CHEMICAL INDUSTRY, OF SAME PLACE.

BLACK DYE.

SPECIFICATION forming part of Letters Patent No. 449,629, dated March 31, 1891.

Application filed January 15, 1891. Serial No. 377,876. (No specimens.) Patented in France August 16, 1890, No. 207,656.

*To all whom it may concern:*

Be it known that I, JAKOB SCHMID, a citizen of Switzerland, residing at Basle, Switzerland, have invented new and useful Improvements in the Production of a Black Azo Dye-Stuff or Coloring-Matter, (for which I have received Letters Patent in France, dated August 16, 1890, No. 207,656,) of which the following is a specification.

I have discovered that black coloring-matters can be obtained by the reaction of the monoalkylized derivatives of beta-naphthylamine of the general formula

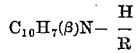

(where R represents methyl, ethyl, and amyl,) upon the diazo compound of the formula

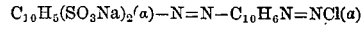

This last-named diazo compound is obtained by the combination of alpha-naphthylamine disulphonic acid (German Letters Patent No. 41,957) with alpha-naphthylamine and by rediazotization of the well-known amidoazo compound, if monoethyl-beta-naphthylamine is used in the preparation of my new dye-stuff. Said dye-stuff has the following composition:

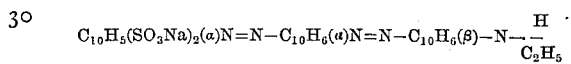

The following example will sufficiently show how my invention can be practically carried out:

Thirty-five kilos of the so-called "Dahl's alpha-naphthylamine disulphonic acid" are diazotized with seven kilos of nitrite of sodium and thirty-five kilos of muriatic acid in the well-known manner, and to the solution thus obtained is added an aqueous solution of eighteen kilos of hydrochlorate of alpha-naphthylamine. The amidoazo compound obtained by this treatment is converted into the diazoazo compound by the action of seven kilos of nitrate of sodium and then added to a solution of 17.5 kilos of monoethyl-beta-naphthylamine and fifteen kilos hydrochloric acid; or an equivalent quantity of monomethyl or monoamyl-beta-naphthylamine may be used. By the action of the monoalkylized beta-naphthylamine the new black dye-stuff is readily formed if the hydrochloric acid is weakened by the addition of acetate of soda. The mixture is allowed to stand for some hours, after which I precipitate the dye-stuff in the form of its sodium salt, filter, and press. The coloring-matter thus obtained represents when dried a dark brown powder. It is easily soluble in water with a bluish-black color, difficultly soluble in alcohol, and insoluble in benzine. Its solution in concentrated sulphuric acid shows a green color, and by the addition of water the dye-stuff acid is precipitated in the form of a blue-black mass. The aqueous solution is not changed by the addition of caustic alkalies, but precipitated by the addition of mineral acids.

The coloring-matters obtained in the manner above described dye on wool and silk a fast brilliant black color which in light shades presents a bluish gray.

From the coloring-matter described in Letters Patent No. 412,440 my invention differs theoretically by the presence of the alkyl group (represented in the example given on line 14, page 1, by $C_2H_5$) in place of the amido group $NH_2$, and it differs technically by the fact that it dyes on wool and silk a deep-black color.

What I claim as new, and desire to secure by Letters Patent, is—

As a new product, the dark brown powder derived from monoalkylized derivatives of beta-naphthylamine and a diazo compound of the formula

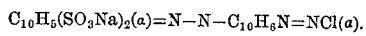

which is easily soluble in water, difficultly soluble in alcohol, and insoluble in benzine, and its aqueous solution is not changed by the addition of caustic alkalies, but precipitated by the addition of mineral acids.

In testimony whereof I have hereunto set my hand and seal in the presence of two subscribing witnesses.

JAKOB SCHMID. [L. S.]

Witnesses:
F. WALTER,
GEORGE GIFFORD.